(12) United States Patent
Cado et al.

(10) Patent No.: US 7,163,291 B2
(45) Date of Patent: Jan. 16, 2007

(54) POLARIZATION SPLITTER, METHOD OF MANUFACTURING SAME AND OPHTHALMIC LENS INCORPORATING PROJECTION INSERTS CONTAINING IT

(75) Inventors: Herve Cado, Champigny sur Marne (FR); Renaud Moliton, Paris (FR)

(73) Assignee: Essilor International (Compagnie Generale d'Optique) (FR)

( * ) Notice: Subject to any disclaimer, the term of this patent is extended or adjusted under 35 U.S.C. 154(b) by 0 days.

(21) Appl. No.: 11/154,429

(22) Filed: Jun. 16, 2005

(65) Prior Publication Data

US 2005/0243433 A1 Nov. 3, 2005

Related U.S. Application Data

(62) Division of application No. 10/727,103, filed on Dec. 2, 2003, now abandoned.

(30) Foreign Application Priority Data

Dec. 3, 2002 (FR) .................................. 02 15197

(51) Int. Cl.
*G02C 7/10* (2006.01)
(52) U.S. Cl. ........................................ 351/163; 351/49
(58) Field of Classification Search ................ 351/163, 351/49
See application file for complete search history.

(56) References Cited

U.S. PATENT DOCUMENTS

| | | | |
|---|---|---|---|
| 4,689,387 A | 8/1987 | Kajimoto et al. ............. 528/76 |
| 4,775,733 A | 10/1988 | Kanemura et al. ............ 528/67 |
| 4,863,246 A * | 9/1989 | Anthon ........................ 359/487 |
| 5,453,859 A | 9/1995 | Sannohe et al. ............... 349/9 |
| 5,986,815 A * | 11/1999 | Bryars ......................... 359/634 |
| 6,075,651 A * | 6/2000 | Hoppe ......................... 359/641 |
| 6,157,420 A | 12/2000 | Nakanishi et al. ............. 349/9 |
| 6,229,645 B1 * | 5/2001 | Hendrix ....................... 359/483 |
| 6,250,764 B1 | 6/2001 | Aoki et al. .................... 353/31 |
| 6,384,974 B1 | 5/2002 | Joubert et al. ............... 359/498 |
| 6,394,603 B1 | 5/2002 | Miwa et al. |
| 6,623,121 B1 | 9/2003 | Sato |
| 6,859,315 B1 | 2/2005 | Sawamura ................... 359/487 |
| 6,926,410 B1 * | 8/2005 | Weber et al. ................. 353/20 |
| 2002/0012099 A1 | 1/2002 | Miwa et al. |
| 2002/0089648 A1 | 7/2002 | Sato |
| 2004/0090900 A1 * | 5/2004 | Yoo et al. ............. 369/112.08 |

FOREIGN PATENT DOCUMENTS

| | | |
|---|---|---|
| JP | 10-154345 | 6/1998 |
| JP | 2001-4840 | 1/2001 |

* cited by examiner

*Primary Examiner*—Jordan M. Schwartz
(74) *Attorney, Agent, or Firm*—Fish & Richardson P.C.

(57) ABSTRACT

Disclosed is a polarization splitter in which reflection for the S polarization is locally centered on at least one emission peak of the image-emitting source of a micro-display or in which reflection for the S polarization is locally centered on at least one peak corresponding to a wavelength selected from red, green and blue. Also disclosed are applications to an ophthalmic lens incorporating inserts for projecting an image towards the user.

24 Claims, 4 Drawing Sheets

POLARIZATION SPLITTER, METHOD OF MANUFACTURING SAME AND OPHTHALMIC LENS INCORPORATING PROJECTION INSERTS CONTAINING IT

CROSS REFERENCE TO RELATED APPLICATION

Pursuant to 35 U.S.C. § 120, this application is a divisional of prior U.S. application Ser. No. 10/727,103, filed Dec. 2, 2003 now abandoned, which claims priority to French application no. 02 15 197, filed Dec. 3, 2002. The contents of the prior applications are incorporated herein by reference in their entirety.

FIELD OF THE INVENTION

The present invention relates to a polarization splitter. The invention further relates to a method of manufacturing such a polarization splitter. It additionally relates to ophthalmic lenses having inserts for projecting an image towards the user, comprising such a polarization splitter. The invention finally relates to devices for projecting an image towards the user, comprising such ophthalmic lenses.

BACKGROUND OF THE INVENTION

Polarization splitters are optical elements which enable light to be broken down into its different polarization components. The direction of polarization of the light is defined with respect to the oscillation plane of the electric field. More often than not, non-polarized light is broken down into its two orthogonal linear polarizations. This being the case, a distinction is made between (perpendicular) S polarization and (parallel) P polarization. In S polarized light, the oscillation plane is perpendicular to the plane of incidence defined by the normal line of the surface and the incidence vector. In P polarization light, the oscillation plane is parallel to the plane of incidence. The components can be split by absorption or by reflection.

Generally speaking, polarization splitters transmit P polarization and reflect S polarization. It is generally accepted that an ideal polarization splitter reflects all the polarized light perpendicularly to the plane of incidence (S), whereas it transmits all the polarized light parallel with the plane of incidence (P) (for a given wavelength). The efficiency of the polarization splitting function may be expressed as the product of the spectral reflection of the S polarization (Rs) multiplied by the spectral transmission of the P polarization (Tp), namely (Rs)×(Tp) (at a given wavelength). It is also generally acknowledged that the aim in producing a polarization splitter is to achieve an efficiency in excess of 80% and preferably in excess of 90%.

Polarization splitters lend themselves to various applications, which include ophthalmic lenses incorporating inserts for projecting an image towards a user.

By this is meant ophthalmic lenses of image-combining systems for spectacles or masks; an image is projected towards the eye of the wearer via an optical path determined by the lens; the term "lens" is then used to refer to the optical system containing the inserts, which may be designed in particular to be mounted in a spectacle frame or in a mask. The inserts may contain mirrors, beam splitters, polarization splitter cubes, quarter-wave plates, lenses, mirrors, concave reflective lenses (a Mangin mirror, for example), diffraction lenses and/or holographic components. A device for projecting images towards the user will then comprise the lens mounted in spectacles or masks and an image source such as a micro-screen, for example a liquid crystal micro-screen, more specifically a Kobin CyberDisplay 320 micro-display.

In such applications, the polarization splitter elements are used to process the polarized light emitted by the micro-screens currently used, such as micro-displays.

Figure 1:
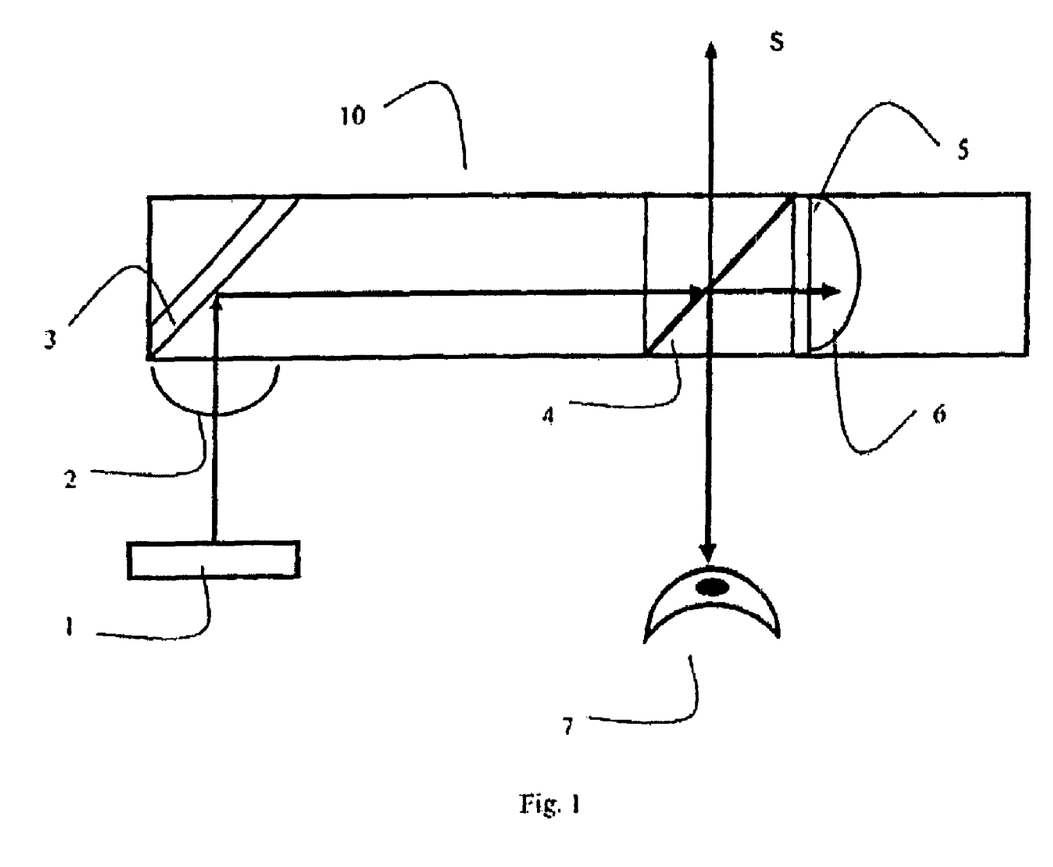
FIG. 1 is a schematic diagram of an ophthalmic lens with inserts for projecting an image toward the user.

One example of such an ophthalmic lens is illustrated in FIG. 1. The image is emitted by a source 1. The source 1 may be a miniaturized micro-screen such as a liquid crystal micro-display emitting polarized light (P). The optical system of the projecting ophthalmic lens 10 comprises a field lens 2. A mirror 3 and the polarization splitter 4 are placed so as to intercept the optical path travelled by the image inside the ophthalmic lens 10. Bonded to the polarization splitter 4 is a quarter-wave plate 5 and a Mangin mirror 6.

The ophthalmic lens 10 operates in the following manner. Polarized light from the source 1 passes firstly through a field lens 2. Having passed through it, it is reflected by a mirror 3, which returns turns it through an angle of 90°. The light then passes through the polarization splitter 4, whereby one of the polarization components (S) is reflected and the other (P) is transmitted. The transmitted component passes through a quarter-wave plate 5, the axes of which are arranged at 45° relative to the propagation direction P in the plane perpendicular to the propagation direction, then strikes a Mangin mirror 6, which reflects the light so that it is sent back through the quarter-wave plate. The light, which is now S polarized, is reflected by the polarization splitter towards the eye of the observer. Consequently, this embodiment enables the polarized light transmitted by the micro-screen to be sent back towards the eye 7.

However, a device of this type incorporating an "ideal" polarization splitter has a drawback in that, in terms of ophthalmic function, it directs only 50% of the light from an object towards the eye because 50% of this light is S polarized and is therefore reflected by the splitter.

The following definitions will be used throughout this description.

See-through image: see-through image refers to the image of a scene as viewed when the light rays pass directly through the polarization splitter element.

Screen image: screen image refers to the image of a light source (in our example a micro-screen) passing though the lens inserted in the display glass, as illustrated in FIG. 1.

Efficiency of the polarization splitting function: see above.

Efficiency of the vision see-through function: this refers to the value of the mathematical integral of the product in terms of non-polarized light of the polarization splitter [=½*(Tp+Ts) multiplied by the emission spectrum of the source divided by the integral of the emission spectrum of the source [in the spectral domain in question].

Transmission of the imaging function of the display glass: this refers to the value of the mathematical integral of the product of the spectral transmission of the imaging function of the display glass (defined by the optical path in FIG. 1) multiplied by the emission spectrum of the source divided by the integral of the emission spectrum of the source [in the spectral domain in question].

It should be noted that transmission of the imaging function of the display glass as well as transmission of the see-through vision function may also be weighted by the spectral sensitivity, of the eye. This is then referred to as "photopic transmission of the imaging function of the display glass". The normalized curve Y of the CIE (Commission International de l'Eclairage) 2° observer will be used as the curve representing the spectral sensitivity of the eye.

Figure 2:
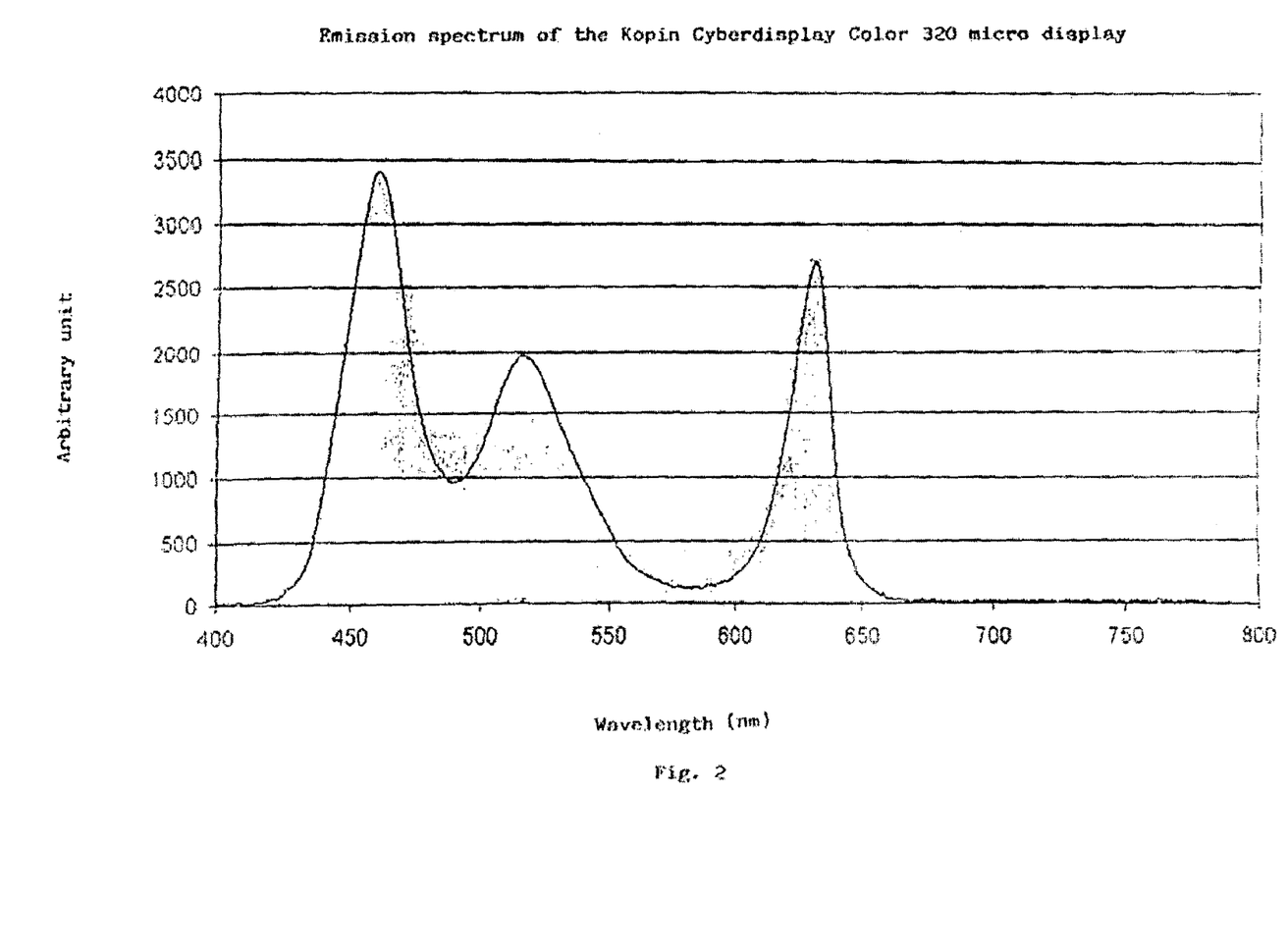
FIG. 2 represents the spectrum of the emission source (Kopin Cyberdisplay Color 320 micro-display)

Locally centered: a curve is said to be locally centered on the emission spectrum of the light source when:
- the spectrum of the emission source assumes the form of peaks (see FIG. 2, for an example of this);
- around an emission peak of the light source, within a restricted spectral domain with an order of magnitude that is twice the mid-height width of the emission peak of the source, the curve follows a peak (or a valley), the local extremum of which is not spectrally distant from the apex of the emission peak of the source by greater than the value of the mid-height width of this peak;
- alternatively, the Rayleigh criterion may also be applied, on the assumption that two curves are locally centered.

BRIEF SUMMARY OF THE INVENTION

The invention therefore provides a polarization splitter which improves "see-through" vision whilst maintaining a high screen transmission. The invention also enables a balance to be maintained between the colors of the two images received by the eye.

The invention is based, in particular, on the discovery that it is sufficient for the polarization splitter to reflect the S polarization around the frequencies at which the micro-display emits, in other words, typically 630, 520 and 460 nm (corresponding to the colors red, green and blue, respectively).

The invention therefore provides a polarization splitter, in which reflection of the S polarization is locally centered on at least one emission peak of the emission source of a micro-screen image.

Micro-screens or micro-displays are generally known and nowadays are based on LCD technology; one example is the Kopin micro-display. Moreover, it is an easy matter to measure the energy emission spectrum of such a micro-display and determine at least one emission wavelength from it.

According to one embodiment, the reflection of the splitter is locally centered on at least two peaks.

According to one embodiment, the reflection of the splitter is locally centered on at least one peak in the visible spectrum.

The invention also proposes a polarization splitter in which reflection of the S polarization is locally centered on at least one peak corresponding to a wavelength selected from red, green and blue.

Transmission of the S polarization is effected in a "comb" pattern (if this transmission is centered on two wavelengths at least).

According to one embodiment, the splitter reflects the polarization S centered on the red, green and blue.

According to one embodiment, the peaks of the spectral reflectance curve for the S polarization in the splitter, locally centered around the peaks, have a maximum level of between 60 and 100%, preferably between 80 and 100%.

According to one embodiment, the spectral reflectance curve for the S polarization in the splitter has a level of between 0 and 35%, preferably between 0 and 20%, in all zones that are not locally centered around the peaks.

According to one embodiment, each peak of the spectral reflectance curve of the S polarization in the splitter, centered around one of the peaks, has a mid-height width of between 5 and 100 nm, preferably between 20 and 80 nm.

According to one embodiment, each peak of the curve in the splitter resulting from the product of the spectral transmittance for the P polarization and the spectral reflectance for the S polarization, centered around one of the peaks, has a mid-height width ranging between 5 and 100 nm, preferably between 20 and 80 mm.

According to one embodiment, the spectral transmittance for the P polarization in the splitter is in excess of 80%, preferably in excess of 90%, on the emission spectrum of the source, which is preferably between 400 and 700 mm.

In one embodiment the integrated mean transmittance in the splitter between 400 and 700 nm is greater than 70%.

According to one embodiment, the splitter has a substrate comprising a stack of thin layers.

According to one embodiment, the splitter has a substrate comprising a holographic element.

According to one embodiment, one of the materials in the stack is silicon dioxide.

According to one embodiment, one of the materials in the stack is zirconium dioxide or praseodymium titanate.

According to one embodiment, the splitter according to the invention is in the form of a cube made up of two prisms.

The invention also relates to a method of manufacturing a polarization splitter, comprising the following steps:
(i) providing a substrate; and
(ii) depositing thin layers.

The invention further relates to an ophthalmic lens having inserts for projecting an image towards the user, comprising a polarization splitter according to the invention.

According to one embodiment, the polarization splitter is in the form of a cube.

The invention further relates to a device for projecting an image towards the user, comprising a lens according to the invention.

According to one embodiment, the projection device additionally comprises a liquid crystal micro-screen.

According to one embodiment, the liquid crystal micro-screen in the projection device emits a polarized light P in the red, green and blue spectrum.

BRIEF DESCRIPTION OF THE DRAWINGS

The invention will be described in more detail with reference to the appended drawings, of which.

DETAILED DESCRIPTION OF THE INVENTION

The splitter according to the invention comprises a stack of thin layers on a substrate of a given refractive index. It may also comprise a substrate provided with a stack or holographic element.

For example, it might be a stack containing only two materials, one a "high refractive index" material and the other a "low refractive index" material, in an alternating arrangement.

This embodiment has been chosen due to the fact that it is easy to produce. However, it would also be possible to use 20 different materials, for example, arranged in a stack of 20 layers, using materials which might be termed "medium refractive index".

As a high refractive index material, $ZrO_2$, a well known material, might be used, or $PrTiO_3$ (praseodymium titanate). In the latter case, the material is deposited on the substrate starting with a non-stoichiometric compound [available from the Merck company under the name of Substance H2], which is deposited by vacuum deposition in the presence of oxygen. The compound is then in oxidized form and produces a transparent film corresponding to the formula $PrTiO_3$.

The refractive index of $PrTiO_3$ is 2.0095 at 635 nm (reference wavelength). The refractive index of $ZrO_2$ is 1.9883.

The second material therefore has a lower refractive index than the first. These materials include in particular $SiO_2$ and $MgF_2$, the refractive index of $SiO_2$, which is 1.4786 at 635 µm, having been found to be particularly suitable.

The substrate may be any transparent substrate that is compatible with the materials constituting the stack and in particular may be inorganic or organic substrates.

By "inorganic substrate" is meant a substrate of mineral glass, as opposed to the concept of "organic substrate", which is made from a polymer.

Appropriate materials for organic substrates are, for example, polymers from the sort consisting of polythiourethanes, obtained from a polythiol and a polyisocyanate. Such materials and the process by which they are obtained are described in patents U.S. Pat. Nos. 4,689,387 and US 4,775,733, for example.

Suitable polythiols might include, for example, pentaerythrol tetrakis (thioglycolate), pentaerythrol tetrakis (mercapto-propionate) or MDO [4-mercapto-methyl-3,6-dithia-1,8-octane dithiol]. The polyisocyanate may be xylylene diisocyanate in particular.

One particularly suitable organic substrate is obtained by polymerising compositions based on xylylene diisocyanate, pentaerythritol tetrakis(mercapto-propionate) and MDO. Such a product is available from the Mitsui company under the name of MR8.

In terms of the inorganic substrate, material 1.6 sold by Corning, Code 60043, could be used, for example, the optical constants of which are essentially identical to those of MR8.

BK7, sold by Schott Optical Glass, may also be used as an inorganic substrate, for example.

The splitter according to the invention is obtained by depositing successive thin layers. Generally speaking, the stack will have 5 to 20, in particular 10 to 15, layers of material.

During the deposition phase, it may be preferable to maintain the substrate at a temperature above ambient temperature, for example between 80 and 120~C. The substrate is advantageously subjected to an ionic cleaning process prior to the deposition stage, for example with argon.

During the deposition phase, the evaporation rate is generally 1 to 10 nm/s, preferably 2 to 5 nm/s.

The layers and their respective thickness are determined in a conventional manner by a person skilled in the art, as a function of the wavelengths around which transmission is to be centered. The conventional software program "Essential Macleod", version 8.5, 2002, sold by Thin Film Center Inc., 2745 E. Via Rotonda, Tucson, Ariz. 85716, may be used for this purpose, for example. Details of the substrate (indicating its refractive index), the optimisation target adapted to the spectral emission curve of the source of images and the list of materials are entered; the software then simulates the stack.

The polarization splitter according to the invention is particularly well suited to applications of the type involving portable vision equipment, such as ophthalmic lenses with inserts for projecting an image towards the user.

An example of such a lens is illustrated in FIG. 1, details of which were described above. Compared with the embodiment known from the prior art (in which the sought splitter is the "ideal" splitter), the invention permits better "see-through" vision, i.e. the ophthalmic vision of an object. In fact, to the extent that not all the S polarized light is reflected by the splitter, the average transmission is increased. As regards the micro-display, since only some of the S polarized light returned by the mirror after passing through the quarter-wave plate is reflected towards the eye of the user, it produces a drop in the light transmission emitted by the micro-display towards the eye of the user. However, this drop is not significant because the splitter reflects the S polarization around the emission wavelengths of the micro-display.

In the example of an display glass such as defined above, efficiency of the see-through vision passes from a value of about 50% such as obtained with a conventional polarization splitter to a value of about 75% using the polarization splitter according to the invention. At the same time, transmission of the imaging function drops to a value of approximately 40% only, which compares with 50% obtained using a conventional polarization splitter. The above also applies to the optical system, all things being equal, in particular as regards sources of loss.

The ophthalmic lens is preferably made from the same material as the substrate on which the stack of thin layers is deposited, for example MR8 or BK7. This being the case, the splitter is made in the form of a prism. In practice, the fact of using a substrate of the same composition for the splitter and hence with the same refractive index as the material used for the ophthalmic lens, makes the polarization splitter less visible to the wearer and thus reduces discomfort caused by the ophthalmic function of the glass.

For this type of application, if the refractive index $n_3$ is substantially different from the refractive index of the ophthalmic lens, the polarization splitter is advantageously provided in the form of a splitter cube, made up of two prisms, one of them having a stack of the type described above on one of its faces. It would also be possible to design a polarization splitter in the form of a plate embedded in the ophthalmic lens.

The examples described below are intended to illustrate the invention without limiting it. The simulation software used is "Code V", version 9.0, September 2001, available from Optical Research Associate, 3280 East Foothill Blvd, Pasadena, Calif. 91107. The simulated transmission values are calculated on the basis of the formula used for the thin layer stack. Furthermore, a Kopin micro-display is used in all the examples (see FIG. 2).

EXAMPLE 1

A biplanar disc of BK7, refractive index 1.515, was cleaned in an ultrasonic bath (Range M10, standard used for anti-reflective treatments).

Having been thus prepared, the disc was then introduced into a deposition unit under vacuum. It is then subjected to ionic cleaning under argon at a $3 \cdot 10^{-5}$ mbar pressure with a voltage of 120 V at the anode and 1 A of ionic current for 2 minutes.

A layer of $PrTiO_3$ was then deposited at a thickness as indicated in Table 1, at a pressure of $2.5 \cdot 10^{-5}$ mbar under the following conditions:

evaporation rate: 3 nm/s;

oxygen pressure: $5 \cdot 10^{-5}$ mbar;

evaporation source: electron gun.

The thickness of the layer was monitored by means of a quartz balance and evaporation halted when the thickness indicated in Table 1 was reached.

A layer of $SiO_2$ was then deposited in a thickness as indicated in Table 1, under the same conditions.

A total of 14 alternating layers were then deposited. After being processed in this manner, the disc was finally cut to obtain polarization splitters of the desired shape.

TABLE 1

| Layer | Material | Refractive index | Thickness [nm] |
|---|---|---|---|
| 1 | $SiO_2$ | 1.4786 | 19.19 |
| 2 | $PrTiO_3$ | 2.0095 | 139.24 |
| 3 | $SiO_2$ | 1.4786 | 25.3 |
| 4 | $PrTiO_3$ | 2.0095 | 60.36 |
| 5 | $SiO_2$ | 1.4786 | 21.89 |
| 6 | $PrTiO_3$ | 2.0095 | 124.97 |
| 7 | $SiO_2$ | 1.4786 | 48.24 |
| 8 | $PrTiO_3$ | 2.0095 | 130.20 |
| 9 | $SiO_2$ | 1.4786 | 48.27 |
| 10 | $PrTiO_3$ | 2.0095 | 466.56 |
| 11 | $SiO_2$ | 1.4786 | 15.92 |
| 12 | $PrTiO_3$ | 2.0095 | 228.54 |
| 13 | $SiO_2$ | 1.4786 | 71.59 |
| 14 | $PrTiO_3$ | 2.0095 | 113.38 |

Figure 3:
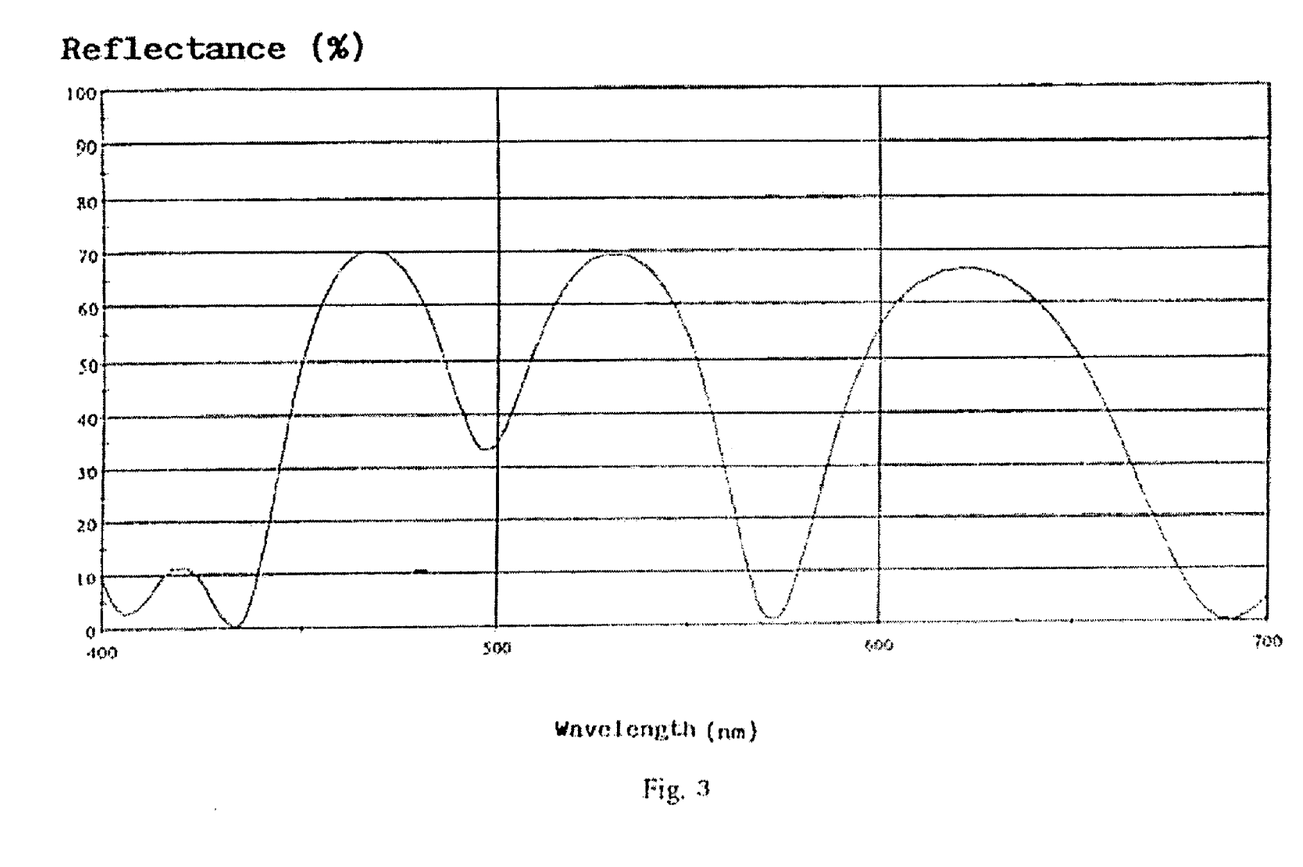
FIG. 3 shows the spectral reflectance curve for the S polarization for a polarization splitter according to the invention.
Figure 4:
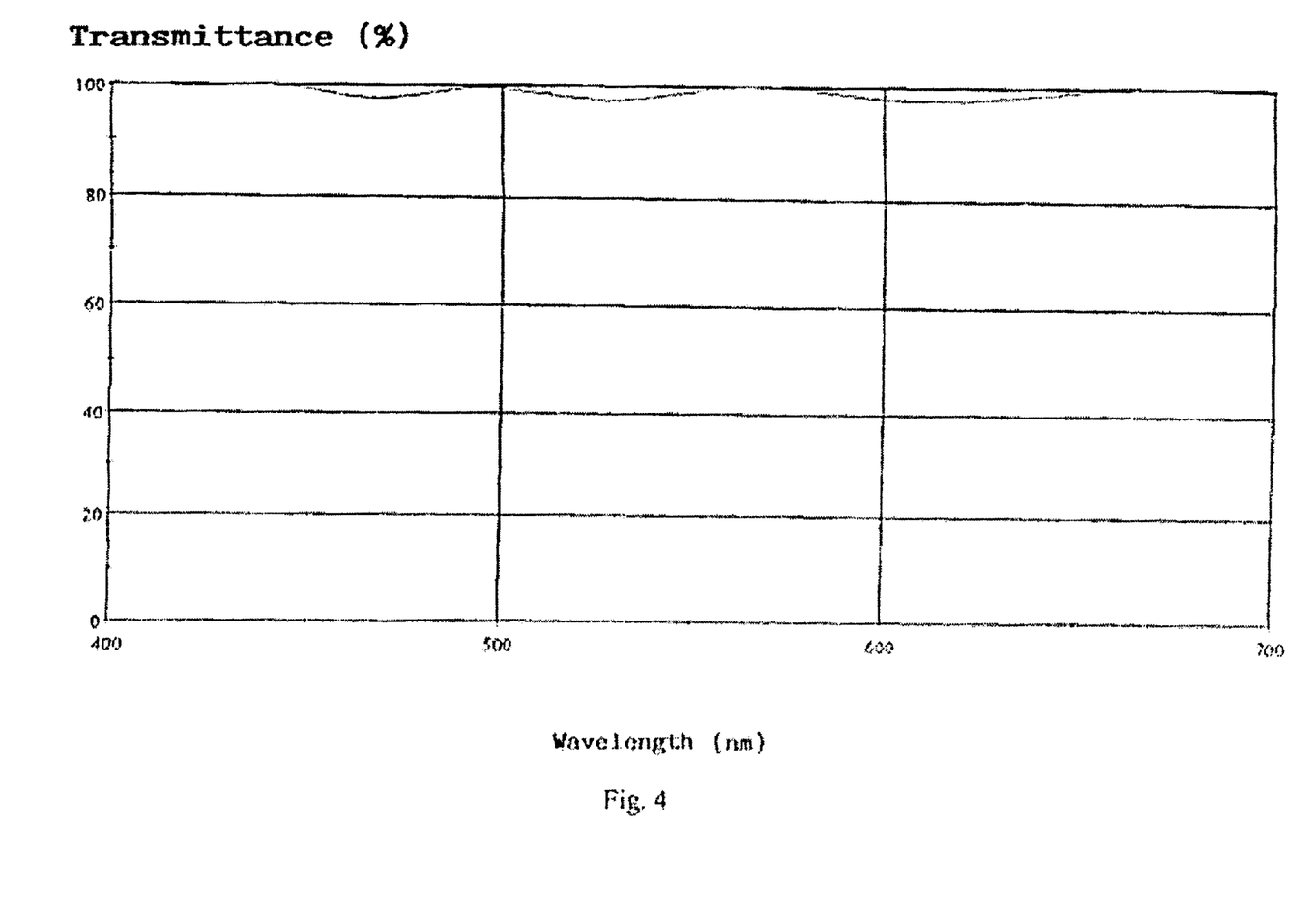
FIG. 4 shows the spectral transmittance curve for the P polarization for a polarization splitter according to the invention.

The optical characteristics of a polarization splitter thus obtained are indicated in FIGS. 3 and 4 at an incidence of 45 °. FIGS. 3 and 4 illustrate the spectral reflectance and transmittance of the polarization splitter with regard to the S and P polarization light respectively. It may be noted that the transmittance is on average at least 95% for the P polarization light whereas the S polarization light is reflected as a function of the wavelength, this reflection (or transmission) being centered around the red, green and blue wavelengths (at 630, 520 and 460 nm respectively). Transmission is between approximately 25 and 30%, the mid-height widths being between approximately 35 and 70 nm.

The integrated average transmission between 400 and 700 nm is approximately 75%, which represents a gain of 25% in terms of ophthalmic vision compared with a conventional splitter.

The visual transmission (weighting of the transmission by the spectral response of the eye) is also approximately 75%.

The transmittance of the imaging function was also determined for the center and edges of the field of vision in order to determine the effect of angle on processing. The transmission is calculated for a standardized CIE (Commission International de l'Eclairage) user Y in the example of a display glass of the type illustrated in FIG. 1. The values obtained are as follows (FOV: Field of View, −4 to +4° and −5 to +5°, respectively).

Blue Y vs FOV

|  | −5 | 0 | 5 |
|---|---|---|---|
| 4 | 34.45 |  | 35.34 |
| 0 | 34.49 | 35.98 | 35.33 |
| −4 | 34.45 |  | 35.34 |

Green Y vs FOV

|  | −5 | 0 | 5 |
|---|---|---|---|
| 4 | 31.29 |  | 39.57 |
| 0 | 31.47 | 37.59 | 39.59 |
| −4 | 31.27 |  | 39.57 |

Red Y vs FOV

|  | −5 | 0 | 5 |
|---|---|---|---|
| 4 | 39.04 |  | 34.01 |
| 0 | 39.13 | 38.61 | 33.93 |
| −4 | 39.02 |  | 34.01 |

It is therefore evident that the transmissions tended to be well balanced between the three colors on the field of vision, which means that perception of the colors is well preserved over the whole image.

The visual transmission of white obtained at the center of the field of the micro-display was 39% (compared with approximately 54% with an "ideal" splitter); the calculation of this transmission takes account of other sources of loss. A slightly reduced value such as this does not give rise to any significant perception by the eye and does not cause discomfort.

The variation in transmittance as a function of the angle of incidence was also determined. A slightly asymmetrical behaviour was observed in the red and blue but overall stability was preserved in the white spectrum cross the entire field.

The colorimetric co-ordinates of the blue displayed by the micro-display were also analysed and the colorimetric shift of the CIE co-ordinates x, y, z of the white displayed by the device compared with the white displayed by the micro-display was analysed. This shift is expressed here as being the distance of the micro-display from white in the space x, y:

Distance relative to white micro-display (space x, y)

$D^2 = (x - x_{white})^2 + (y - y_{white})^2$

| 0.025826253 |  | 0.0175353 |
| 0.025264825 | 0.012468111 | 0.019038742 |
| 0.025812775 |  | 0.0175353 |

It may be noted that the splitter according to the invention has very little effect on the way colors are perceived in the imaging process. It modifies the colors of the micro-display very little.

The see-through transmission was also calculated for various angles of incidence on the splitter. The values are 74.57%, 76.60% and 76.28% for angle values of 40⌢, 45° and 50°, respectively. Transmission is therefore homogeneous.

A colorimetric study was also undertaken in order to determine the effect of the splitter according to the invention in "see-through" mode. The micro-display in "see-through" vision can be used as the source of white light for this purpose and the modification in the perception of this white light observed. The results are expressed on the basis of the CIE co-ordinates x,y,z. The angle of incidence is 40⌢, 45° and 50°. The results are set out below.

| 40° | x | y | z |
|---|---|---|---|
| Sample | 0.32528584 | 0.3162037 | 0.35851046 |
| Micro-display | 0.31273021 | 0.32903828 | 0.35823151 |
| Delta | 0.01255563 | −0.01283458 | 0.00027896 |
| 45° | x | y | z |
| Sample | 0.31966024 | 0.33805613 | 0.34228364 |
| Micro-display | 0.31273021 | 0.32903828 | 0.35823151 |
| Delta | 0.00693002 | 0.00901785 | −0.01594787 |
| 50° | x | y | z |
| Sample | 0.31092033 | 0.34921327 | 0.33986641 |
| Micro-display | 0.31273021 | 0.32903828 | 0.35823151 |
| Delta | −0.00180989 | 0.02017499 | −0.0183651 |

This same study was undertaken for each color, red, green and blue, and supports the results obtained above.

EXAMPLE 2

The procedure was the same as that described in Example 1, but on a MR8 substrate (in fact an inorganic support corresponding to MR8), with a refractive index 1.5931.

The values are set out in table 2.

TABLE 2

| Layer | Material | Thickness [nm] |
|---|---|---|
| 1 | PrTiO$_3$ | 153.03 |
| 2 | SiO$_2$ | 240.94 |
| 3 | PrTiO$_3$ | 79.04 |
| 4 | SiO$_2$ | 50.45 |
| 5 | PrTiO$_3$ | 141.05 |
| 6 | SiO$_2$ | 38.16 |
| 7 | PrTiO$_3$ | 236.4 |
| 8 | SiO$_2$ | 21.19 |
| 9 | PrTiO$_3$ | 490.84 |
| 10 | SiO$_2$ | 51.32 |
| 11 | PrTiO$_3$ | 116.76 |

The optical characteristics of a polarization splitter thus obtained are essentially identical to those given in FIG. 3 mentioned above, for an incidence of 45°.

The other conclusions drawn in respect of Example 1 apply to this example mutatis mutandis.

EXAMPLE 3

The procedure was the same as that described in Example 1 but PrTiO$_3$ was replaced by ZrO$_2$ (the deposition conditions were conventional).

The results are unchanged.

EXAMPLE 4

The procedure was the same as that described in respect of Example 2, but PrTiO$_3$ was replaced by ZrO$_2$ (the deposition conditions were conventional).

The results are unchanged.

Apart from the applications described above, the polarization splitter may also be useful in applications involving the supply and processing of polarized light. Furthermore, the polarization splitter according to the invention may be used as a means of splitting light into its circular or elliptical polarization components.

What is claimed is:

1. A device for projecting an image towards the user, comprising a liquid crystal micro-display as an image-emitting source and an ophthalmic lens with inserts for projecting an image towards the user, having a polarization splitter in which said polarization splitter provides reflection of the S polarization locally centered on at least one peak selected from the group consisting of (i) at least one emission peak of the image-emitting source of the micro-display, (ii) red, (iii) green and (iv) blue.

2. The projection device according to claim 1, in which the liquid crystal micro-display emits a P polarized light in red, green and blue.

3. The device according to claim 1, in which reflection is locally centered on at least two peaks.

4. The device according to claim 1 in which reflection is locally centered on at least one peak in the visible spectrum.

5. The device according to claim 3, in which reflection is locally centered on at least two peaks in the visible spectrum.

6. The device according to claim 1, in which reflection for the S polarization is centered on red, green and blue.

7. The device according to claim 1, in which said locally centered peaks of the spectral reflectance curve for the S polarization, have their maximum level comprised between 60 and 100%.

8. The device according to claim 1, in which said locally centered peaks of the spectral reflectance curve for the S polarization, have their maximum level comprised between 80 and 100%.

9. The device according to claim 1, in which the spectral reflectance curve for the S polarization has a level comprised between 0 and 35%, in all zones not locally centered around the peaks.

10. The device according to claim 1, in which the spectral reflectance curve for the S polarization has a level comprised between 0 and 20%, in all zones not locally centered around the peaks.

11. The device according to claim 1, in which each of said locally centered peaks of the spectral reflectance curve of the S polarization, has a mid-height width of between 5 and 100 nm.

12. The device according to claim 1, in which each of said locally centered peaks of the spectral reflectance curve of the S polarization, has a mid-height width of between 20 and 80 nm.

13. The device according to claim 1, in which each peak of a curve resulting from the product of the spectral transmittance for the P polarization and the spectral reflectance for the S polarization, has a mid-height width of between 5 and 100 nm.

14. The device according to claim 1, in which each peak of a curve resulting form the product of the spectral transmittance for the P polarization and the spectral reflectance for the S polarization, has a mid-height width of between 20 and 80 nm.

15. The device according to claim 1, in which spectral transmittance for the P polarization is greater than 80% on the emission spectrum of the source.

16. The device according to claim 15, in which the emission spectrum of the source is between 400 and 700 nm.

17. The device according to claim 1, in which spectral transmittance for the P polarization is greater than 90%, on the emission spectrum of the source.

18. The device according to claim 17 in which the emission spectrum of the source is between 400 and 700 nm.

19. The device according to claim 1, in which the integrated average transmittance between 400 and 700 nm is greater than 70%.

20. The device according to claim 1, in which the polarization splitter comprises a substrate with a stack of thin layers.

21. The device according to claim 1, in which the polarization splitter comprises a substrate with a holographic element.

22. The device according to claim 20, in which one of the materials is silicon dioxide.

23. The device according to claim 20, in which one of the materials is zirconium dioxide or praseodymium titanate.

24. The device according to claim 1, in which the polarization splitter is in the form of a cube made up of two prisms.

* * * * *